(12) United States Patent
Detzner

(10) Patent No.: US 6,669,183 B2
(45) Date of Patent: Dec. 30, 2003

(54) SPRING ELEMENT OF ELASTIC MATERIAL

(75) Inventor: Friedhelm Detzner, Duisburg (DE)

(73) Assignee: Ringfeder VBG GmbH, Krefeld (DE)

( * ) Notice: Subject to any disclaimer, the term of this patent is extended or adjusted under 35 U.S.C. 154(b) by 0 days.

(21) Appl. No.: 09/990,520

(22) Filed: Nov. 21, 2001

(65) Prior Publication Data

US 2002/0074701 A1 Jun. 20, 2002

(30) Foreign Application Priority Data

Dec. 16, 2000 (DE) .......................................... 100 63 007

(51) Int. Cl.⁷ .................................................. F16F 1/36
(52) U.S. Cl. ........................ 267/141; 267/153; 267/293
(58) Field of Search ............................... 267/141, 153, 267/141.2, 293

(56) References Cited

U.S. PATENT DOCUMENTS

| | | | | |
|---|---|---|---|---|
| 2,383,645 A | * | 8/1945 | Hahn | 267/141 |
| 2,716,566 A | * | 8/1955 | Thiry | 267/153 |
| 3,263,985 A | * | 8/1966 | Planta | 267/153 |
| 4,198,037 A | | 4/1980 | Anderson | |
| 4,566,678 A | | 1/1986 | Anderson | |
| 5,447,295 A | * | 9/1995 | Taomo | 267/153 |
| 5,791,637 A | | 8/1998 | Reichelt et al. | |
| 6,220,585 B1 | * | 4/2001 | Heron | 207/153 |
| 6,354,558 B1 | * | 3/2002 | Li | 248/615 |

FOREIGN PATENT DOCUMENTS

DE 1 147 255 4/1963

* cited by examiner

*Primary Examiner*—Matthew C. Graham
(74) *Attorney, Agent, or Firm*—Michael J. Striker

(57) ABSTRACT

A spring element of an elastic material, in particular of synthetic plastic for taking a kinetic energy has a tubular piece, and a base plate which is fixedly connected to the tubular piece, the tubular piece having a wall thickness corresponding to a ratio between an outer diameter and an inner diameter of less than 2 and a structural height within the range of 0.7–1.3 of the outer diameter, so that during deflection with approximately 35% of an initial structural height an open end of the tubular piece is fitted over a force-loaded surface.

12 Claims, 4 Drawing Sheets

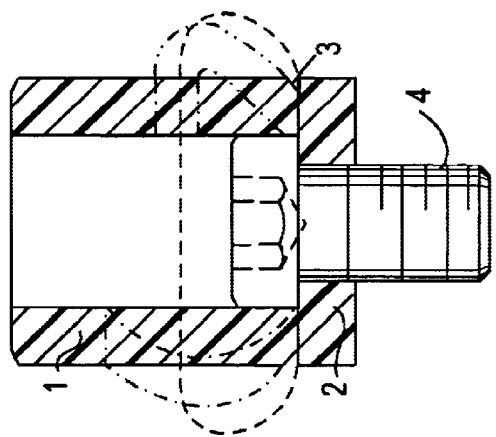
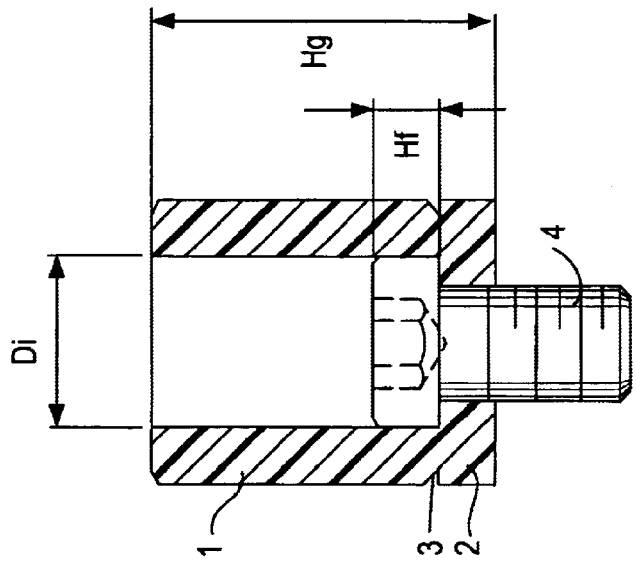
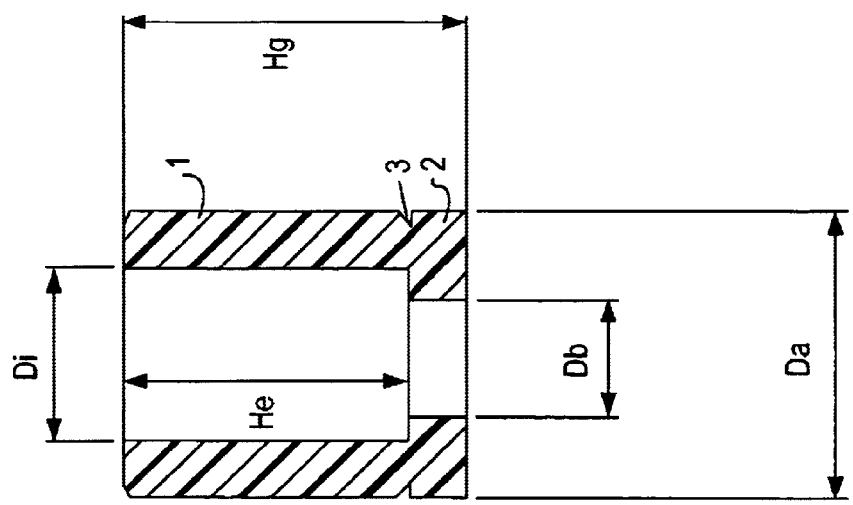

SPRING ELEMENT OF ELASTIC MATERIAL

BACKGROUND OF THE INVENTION

The present invention relates to a spring element which is composed of an elastic material, in particular of synthetic plastic, such as for example polyurethane, for receiving kinetic energy.

In addition to the classic springs of steel (such as helical springs, friction springs) and the hydraulic springs (shock absorbers), springs of synthetic plastic for receiving higher kinetic energies are also popular. A certain disadvantage of springs of synthetic plastic is that, their properties change in response to high temperature fluctuations. This disadvantage is however compensated by low weight, available damping property, simple manufacture and clean handling (no rust, no lubrication). An optimal material use is obtained by a pressure and bending load. Springs of rubber principally have similar properties as those of synthetically produced materials, however their power ability is significantly lower. Springs of foamed material require a great structural volume, Springs of massive material require smaller space.

The most known springs of massive material are tubular springs of polyurethane, such as for example VULCOLLAN of BayerAG, and springs of copolymers of polyester. The relatively thick-walled tubular springs which are disclosed for example in the German patent document DE-11 47 255 are loaded only to up to 40% of their initial height so as not to overstretch the material, and with increasing deflection the force is constantly increased. The springs of copolymers of polyester also known from German patent documents DE 28 44 486 and DE-35 33 435 which correspond to U.S. Pat. Nos. 4,198,037 and 4,566,678 must be pre-pressed initially to 60–90% of their initial height, since the material of nature does not have high spring properties. For this so-called stretching of fibers, a press must be provided, and moreover, by prepressing some of the original structural height is lost. The same is true for the springs disclosed in the German patent document DE 197 00 629 which corresponds to U.S. Pat. No. 5,791,637, which is however expensive with respect to its shape and manufacture.

For many applications, a short structural shape with the spring with high work take-up and low counterforce at high damping and good repeatability is required, especially as a price valuable replacement for less loadable (less than one loading per hour) hydraulic dampers. With the known synthetic plastic springs this can be achieved by overloading. The disadvantage is however a substantial reduction of the service life and a strong settling of the spring.

SUMMARY OF THE INVENTION

Accordingly, it is an object of the present invention to provide a compact spring element with damping properties, which fulfils the above mentioned requirements and simultaneously avoids the disadvantages of the prior art.

In keeping with these objects and with others which will become apparent hereinafter, one feature of present invention resides, briefly stated, in spring element of an elastic material, in particular of synthetic plastic for taking a kinetic energy, which has a tubular piece, and a base plate which is fixedly connected to the tubular piece, the tubular piece having a wall thickness corresponding to a ratio between an outer diameter and an inner diameter of less than 2 and a structural height within the range of 0.7–1.3 of the outer diameter, so that during deflection with 35% of an initial structural height an open end of the tubular piece is fitted over a force-loaded surface.

In accordance with the present invention, the tubular piece of preferably massive polyurethane (one of nature of springy material with sufficient high damping) is fixedly connected with a base plate of preferably the same material. The tubular piece must have a wall thickness which corresponds to a ratio outer diameter to an inner diameter of less than 2, and a structural height in the region of 0.7–1.3 of the outer diameter. Preferably, the base plate has centrally an opening for a simple mounting of the spring element with a connecting means, such as a screw, on a horizontal or a vertical surface of a component to be protected from overloading.

With the thusly designed and mounted spring element, the end surface at the open end of the tubular piece can be acted upon by a counter surface with a force. The spring element can be compressed to 60% of its initial structural height, without overstretching the material. The spring element goes through three phases which are illustrated in FIGS. 3 and 5.

In phase 1 the tubular piece which is fixed with the ground plate is axially upset and extends radially outwardly in its central region.

In phase 2 with the deflection of approximately 35% which corresponds to an outer appearance image at which a part of the tubular wall is deformed outwardly at an angle of approximately 45° to a force-introducing countersurface, the end surface of the tubular piece starts folding inwardly. This process takes place from inner form constraints and requires no force from outside. The spring element assumes a favorable form which is free from stresses. Thereby the tubular piece of the spring element at a reduced force can be further compressed without overstretching of the material.

In phase 3 with a deflection of approximately 55% with respect to the initial height, the force starts again increasing since the surfaces located orthogonal to the force application, in particular the inner surfaces formed by the radial extension, contact more and also the bending forces again increase. At approximately 50% deflection, the forces or stresses are reached as at 35% deflection. A further increase to 60% is not damaging since the force distribution is of large-surface type and results partially from the higher bending.

When the force is removed, without setting phenomena, the original shape and height of the spring element is restored. After maintaining a stationary phase which is required for all elastomeric springs, the loading process, which includes if necessary all remaining phases, is reproducible with the same values.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a spring element in accordance with the present invention as a separate part, in a cross-section;

FIG. 2 is a view showing the spring element of FIG. 1 with an inserted connecting and guiding means;

FIG. 3 shows the spring element of FIG. 2 in different conditions;

DESCRIPTION OF THE PREFERRED EMBODIMENTS

A spring element is composed of a tubular piece 1 and a base plate 2 which is fixedly connected with it and composed preferably of polyurethane. The total height of the spring element is identified with Hg, and the structural height of the tubular piece 1 is identified with He. The wall thickness of the tubular piece corresponds to a ratio of the outer diameter Da to the inner diameter Di of more than 2. The structural height He of the tubular piece 1 is in the range of between 0.7 and 1.3 times the outer diameter Da. An outer circumferential groove 3 provided in a transition region between the tubular piece 1 and the base plate 2 displaces the radial bulging of the tubular piece to the center and therefore enhances the desired deformation conditions.

Since the tubular piece 1 is not always loaded exactly centrally, the spring element must be guided on a partial portion, to avoid a lateral displacement. For this purpose the head of a cylindrical screw 4 which serves simultaneously for mounting of the spring element can be utilized. It passes through an opening with a diameter Db in the base plate 2. The head diameter of the cylindrical screw 4 is equal to the inner diameter Di of the tubular piece 1. The height of the screw head has the guiding height Hf.

Figure 4:
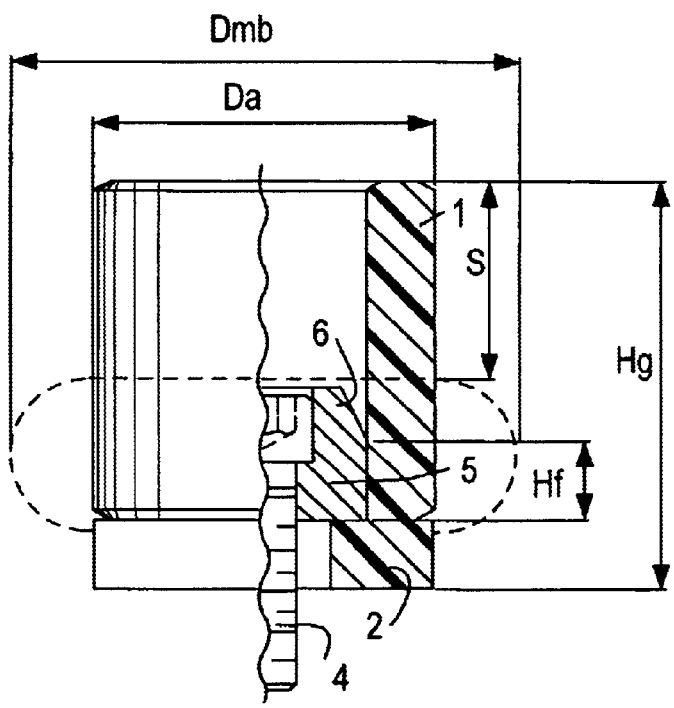
FIG. 4 is a view showing a spring element which deviates with respect to the guiding means.
Figure 5:
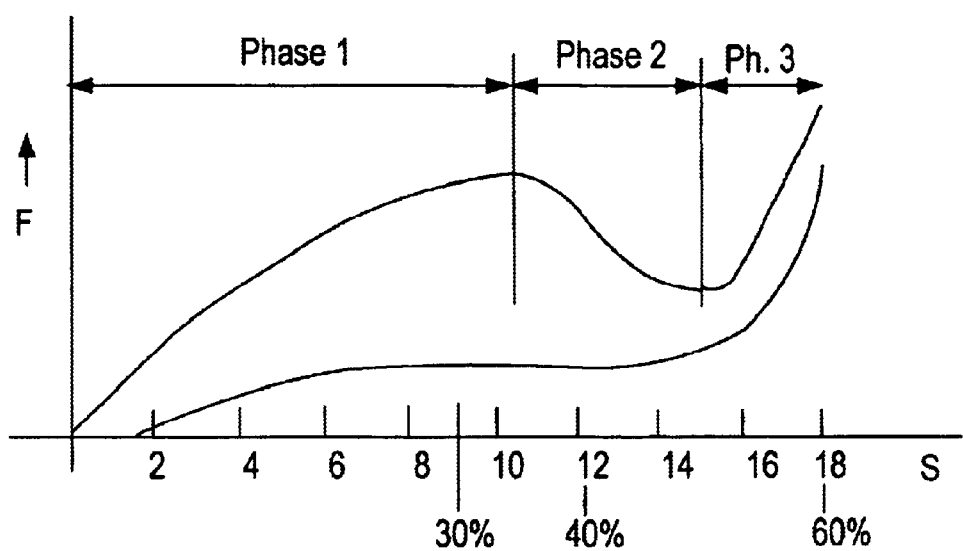
FIG. 5 is a view showing a static deformation diagram with a force F and a path s.

FIG. 4 shows an alternative, in which the use of a separate guiding sleeve 5 is possible. The guiding sleeve has the advantage that a smaller mounting screw 4 can be utilized. Such a smaller mounting screw in turn protects, as an end abutment, the spring element from an overloading, which as a rule is considered for a spring element.

It is advantageous when the mounting screw 4 is located in the guiding sleeve 5 so that the guiding sleeve 5 extends over the screw head as shown in FIG. 4. Therefore during a loading up to the screw head as an abutment, the guiding sleeve 5 transmits forces to the base plate 2 composed of a spring material. Thereby an additional overloading protection with slight force increase is obtained over for example the last 2–3 mm of the spring path.

The guiding sleeve 5 in an upper region has an incline 6 or a step. It serves for guiding the fitted-over force-applying surface of the tubular element 1, prevents material squeezes, and increases thereby the service life of the spring element.

Figure 6:
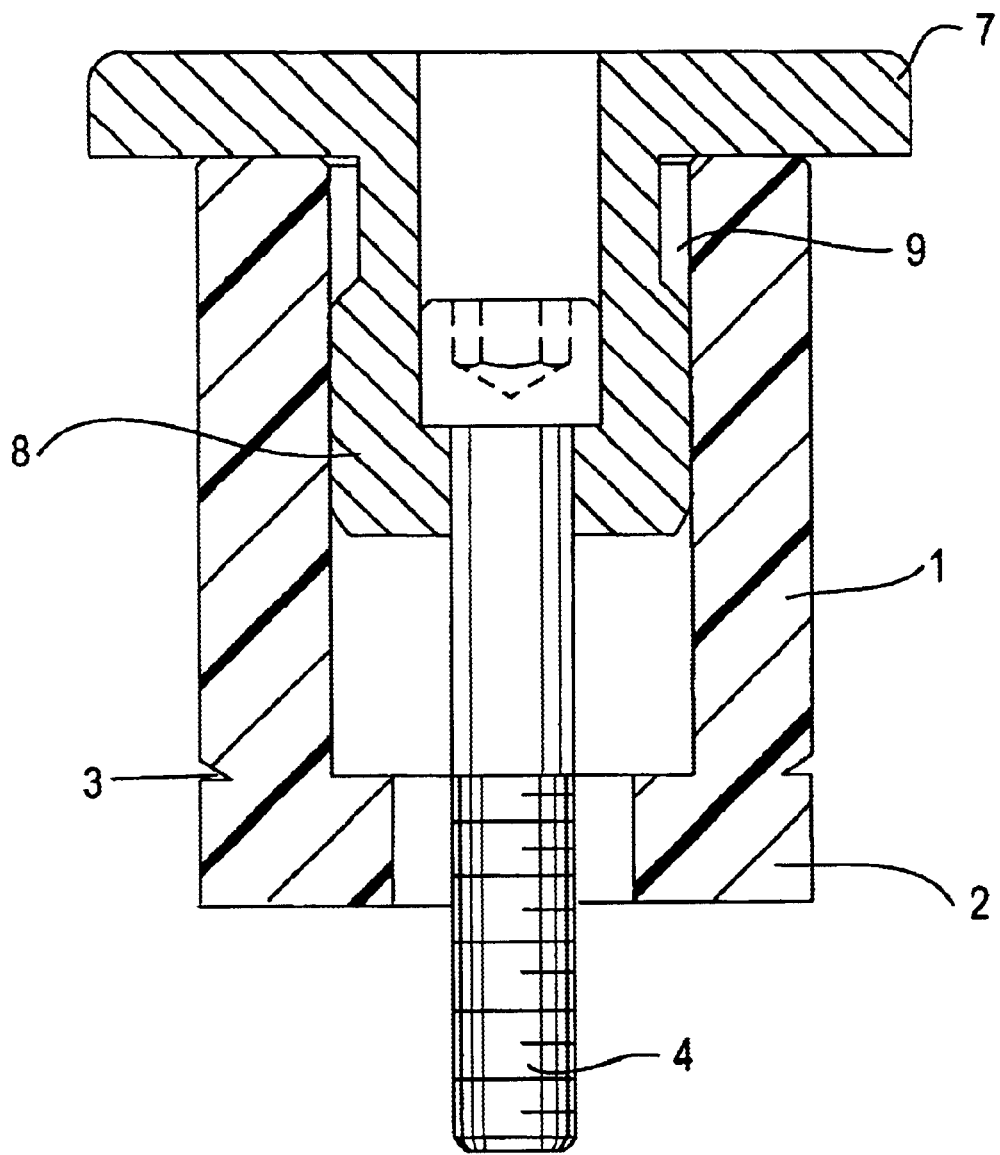
FIG. 6 is a view showing a further embodiment of the spring element in accordance with the present invention.

In the spring element shown in FIG. 6, an additional impact plate 7 with a guiding projection 8 is provided. It extends into the tubular piece 1 and cooperates with the mounting screw 4. A groove-shaped twisters 9 arranged between the impact plate 7 and the guiding projection 8 makes possible the curved turning up of the tubular piece 1 on its open end. The spring element is first of all suitable for loading cases, when the forces do not occur in an axial direction of the tubular piece 1. Such inclined impacts are, for example, taken when the spring element is used as a buffer on the vehicles.

Figure 7:
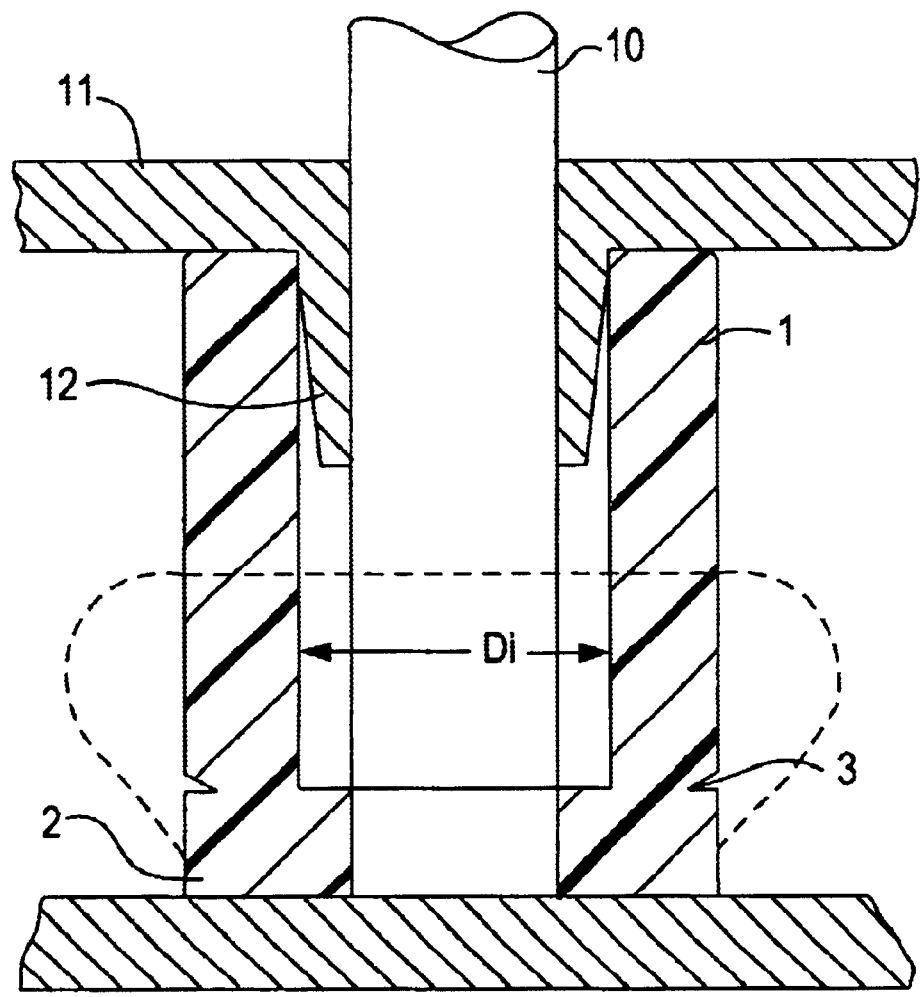
FIG. 7 is a view showing a further embodiment of the spring element in accordance with the present invention.

As shown in FIG. 7 the spring element can be guided at a rod 10 with an upper guiding plate 11, which extends in a tubular element 12 with conical side surfaces on the force transmitting side in the tubular piece 1. The maximum diameter of the tubular element 12 corresponds to the inner diameter Di of the tubular piece 1.

It will be understood that each of the elements described above, or two or more together, may also find a useful application in other types of constructions differing from the types described above.

While the invention has been illustrated and described as embodied in spring element of elastic material, in particular synthetic plastic, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A spring element of an elastic of synthetic plastic for taking a kinetic energy, comprising an elongated tubular piece having an upper end and a lower end; and a base plate which is fixedly connected to said tubular piece and extends transversely to said tubular piece at said lower end, said tubular piece having a wall thickness corresponding to a ratio between an outer diameter and an inner diameter of less than 2 and a structural height within the range of 0.7–1.3 of the outer diameter, so that during deflection with approximately 35% of an initial structural height an open end of said tubular piece is fitted over a force-loaded surface.

2. A spring element as defined in claim 1; and further comprising an outer substantially circumferential groove arranged in a transition region between said elongated tubular piece and said base plate extending transversely to said tubular piece and providing a stress favorable deformation of said tubular piece.

3. A spring element as defined in claim 1, wherein said base plate extending transversely to said tubular piece has a center provided with an opening; and a connecting element extending through said opening for a horizontal or a vertical mounting of the spring element on a component to be protected from overloading.

4. A spring element as defined in claim 3, wherein said connecting element is a cylindrical screw.

5. A spring element as defined in claim 1; and further comprising an inner guiding sleeve for guiding said tubular piece which is a separate sleeve and inserted into said tubular piece, said guiding sleeve having an outer diameter which is equal to an inner diameter of said tubular piece, and a guiding surface with a height corresponding to at least 0.2 times a structural height of said tubular piece.

6. A spring element as defined in claim 4, wherein said guiding sleeve has a cross-section interruption for an easy guiding of the fitted force-transmitting surface of said tubular piece during a further loading.

7. A spring element as defined in claim 5, wherein said cross-section interruption is formed as an incline.

8. A spring element as defined in claim 5, wherein said cross-section interruption is formed as a step.

9. A spring element as defined in claim 5, wherein said guiding sleeve has a surface arranged transversely to a force direction, via which during a contact with the force-transmitting surface of said tubular piece a further transmission of the forces to said base plate is performed, so that an increase of a work take up before an end of a stroke is provided.

10. A spring element as defined in claim 1; and further comprising means for providing an inner stroke limit for protection from overloading.

11. A spring element as defined in claim 10, wherein said means for providing an inner stroke limit include a surface of a connecting means for connecting the spring element to a component to be protected, wherein the surface is arranged transversely to a force direction.

12. A spring element of an elastic material of synthetic plastic for taking a kinetic energy, comprising a tubular piece; and a base plate which is fixedly connected to said tubular piece, said tubular piece having a wall thickness corresponding to a ratio between an outer diameter and an inner diameter of less than 2 and a structural height within the range of 0.7–1.3 of the outer diameter, so that during deflection with approximately 35% of an initial structural height an open end of said tubular piece is fitted over a force-loaded surface; and a rod and an upper guiding plate which extends in a tubular element with conical side surfaces at a force transmitting side of said tubular piece, said tubular element having a maximum diameter corresponding to an inner diameter of said tubular piece.

* * * * *